(12) United States Patent
Chiappetta

(10) Patent No.: US 7,172,334 B2
(45) Date of Patent: Feb. 6, 2007

(54) HAND HELD BLENDER

(75) Inventor: Frank R. Chiappetta, Woodbury, CT (US)

(73) Assignee: Conair Corporation, Stamford, CT (US)

( * ) Notice: Subject to any disclaimer, the term of this patent is extended or adjusted under 35 U.S.C. 154(b) by 113 days.

(21) Appl. No.: 10/733,121

(22) Filed: Dec. 11, 2003

(65) Prior Publication Data
US 2005/0128865 A1 Jun. 16, 2005

(51) Int. Cl.
*A47J 43/044* (2006.01)
(52) U.S. Cl. ..................... 366/129; 366/279
(58) Field of Classification Search ........... 366/129, 366/279, 343, 342
See application file for complete search history.

(56) References Cited

U.S. PATENT DOCUMENTS

| | | | | |
|---|---|---|---|---|
| 1,691,200 A | * | 11/1928 | Krug | 464/177 |
| 2,804,290 A | * | 8/1957 | Kaufman | 366/129 |
| 3,425,087 A | * | 2/1969 | Fitzhugh | 366/129 |
| 3,472,490 A | * | 10/1969 | Fitzhugh | 366/129 |
| 3,666,187 A | * | 5/1972 | Norris | 241/89.4 |
| D271,176 S | | 11/1983 | Zimnowicz | D7/379 |
| 4,468,828 A | * | 9/1984 | Nadolny et al. | 15/97.1 |
| D308,001 S | | 5/1990 | Ricard | D7/379 |
| D314,489 S | | 2/1991 | Van Deursen et al. | D7/379 |
| D323,955 S | | 2/1992 | Rixen | D7/376 |
| D326,585 S | | 6/1992 | van Asten | D7/376 |
| D327,603 S | | 7/1992 | van Asten | D7/376 |
| D345,075 S | | 3/1994 | Saltet | D7/376 |
| D345,076 S | | 3/1994 | Saltet | D7/376 |
| D347,965 S | | 6/1994 | Hoffman et al. | D7/376 |
| D348,587 S | | 7/1994 | Saltet | D7/376 |
| 5,366,286 A | * | 11/1994 | Ruttimann | 366/129 |
| D358,293 S | | 5/1995 | Sebastia | D7/376 |
| D361,241 S | | 8/1995 | Littmann | D7/376 |
| D388,536 S | | 12/1997 | Cote | D28/9 |
| D392,504 S | | 3/1998 | Lallemand | D7/376 |
| D396,775 S | | 8/1998 | Arita et al. | D7/376 |
| D398,809 S | | 9/1998 | Henderson | D7/376 |
| D400,756 S | | 11/1998 | Henderson | D7/376 |
| D408,214 S | | 4/1999 | Cousins | D7/376 |
| D421,872 S | | 3/2000 | Wong | D7/376 |
| D426,105 S | | 6/2000 | Littman | D7/376 |
| D437,184 S | | 2/2001 | Cruz | D7/379 |
| 6,186,056 B1 | * | 2/2001 | Bruno et al. | 366/129 |
| 6,193,404 B1 | | 2/2001 | Calange | 366/129 |
| D447,380 S | | 9/2001 | Feil | D7/376 |
| D456,206 S | | 4/2002 | Feil | D7/476 |
| 6,398,402 B1 | * | 6/2002 | Thomas et al. | 366/129 |
| 6,446,294 B1 | * | 9/2002 | Specht | 15/22.1 |
| D494,410 S | * | 8/2004 | Stuart et al. | D7/379 |
| 2003/0106175 A1 | * | 6/2003 | Lam | 15/28 |

* cited by examiner

*Primary Examiner*—Tony G. Soohoo
(74) *Attorney, Agent, or Firm*—Lawrence Cruz; Steven A. Garner

(57) ABSTRACT

There is provided an hand held blender essentially having at least two housing or body portions, a first housing or body portion suitable for containing a drive motor and a second housing or body portion suitable for containing one or more shanks or shafts operatively connected to the drive motor, and a processing tool operatively connected to the one or more shafts. Each of first and second portions has at least one connector suitable to rotatably connect and/or disconnect the at least two portions, as desired, in a reliable and stable manner.

2 Claims, 4 Drawing Sheets

HAND HELD BLENDER

BACKGROUND OF THE INVENTION

1. Field of the Invention

The present invention relates to blenders. More particularly, the present invention relates to hand held blenders.

2. Description of the Related Art

Hand held blenders including immersion blenders, are well known. Typically, these blenders have a tall, tubular hand grip portion that contains a drive motor, to which a shaft that may be immersed into a liquid or mixture is connected. The shaft typically has an input end operatively connected to the drive motor and an output end operatively connect to a processing tool, such as, for example, a whisk attachment (good for whipping cream), and other accoutrements, such as strainers or beakers, to puree or chop or otherwise mix the contents of individual drinks or the like.

These hand held blenders are very practical for their specific purpose. Conventionally, such blenders are used in combination with any of a variety of separate containers to process (e.g., mix, chop, cut, etc.) any of a variety of different food stuffs of various consistencies from solid to viscous to liquid.

These hand held, immersion blenders, sometimes referred to as stick blenders, can have transmission shafts of approximately 6 to 8 inches in length. Consequently, in operation, any inefficiency at the input end of the transmission shaft is amplified at the output end thereof. Also, the elongated nature of these blenders makes efficient cleaning and storage a challenge.

Thus, it is an advantage for effective operation, storage and/or cleaning purposes to provide a hand held blender that ensures a reliable and stable connection between the transmission shaft and the drive motor, and that provides that the connection is quickly and easily releasable via a user interaction. It is also desirable to provide such a hand held blender with two or more hand grip portions to facilitate efficient operation of the blender during use.

SUMMARY OF THE INVENTION

It is an object of the present invention to provide an effective and versatile hand held blender.

It is another object of the present invention to provide a hand held blender that ensures a reliable and stable connection between a transmission shaft and a drive motor.

It is still another object of the present invention to provide a hand held blender that provides that the connection between a transmission shaft and a drive motor is quickly and easily releasable via a user interaction.

It is yet another object of the present invention to provide a hand held blender that has at least two portions, each preferably having a connector that provides a hermetic seal and allows each portion to be separately cleaned and/or stored without compromising the inner workings thereof.

It is a further object of the present invention to provide a hand held blender that has one or more hand grip portions to facilitate efficient operation of the blender during use.

It is still a further another object of the present invention to provide a hand held blender that facilitates uniform blending and/or comminuting results via effective and efficient handling of the blender.

These and other objects and advantages of the present invention are achieved by a hand held blender having at least a two portions, each portion preferably having at least one connector suitable to rotatably connect and/or disconnect the at least two portions, as desired, in a reliable and stable manner. In addition, the hand held blender may be provided with two or more handles.

DETAILED DESCRIPTION OF THE INVENTION

Figure 1:
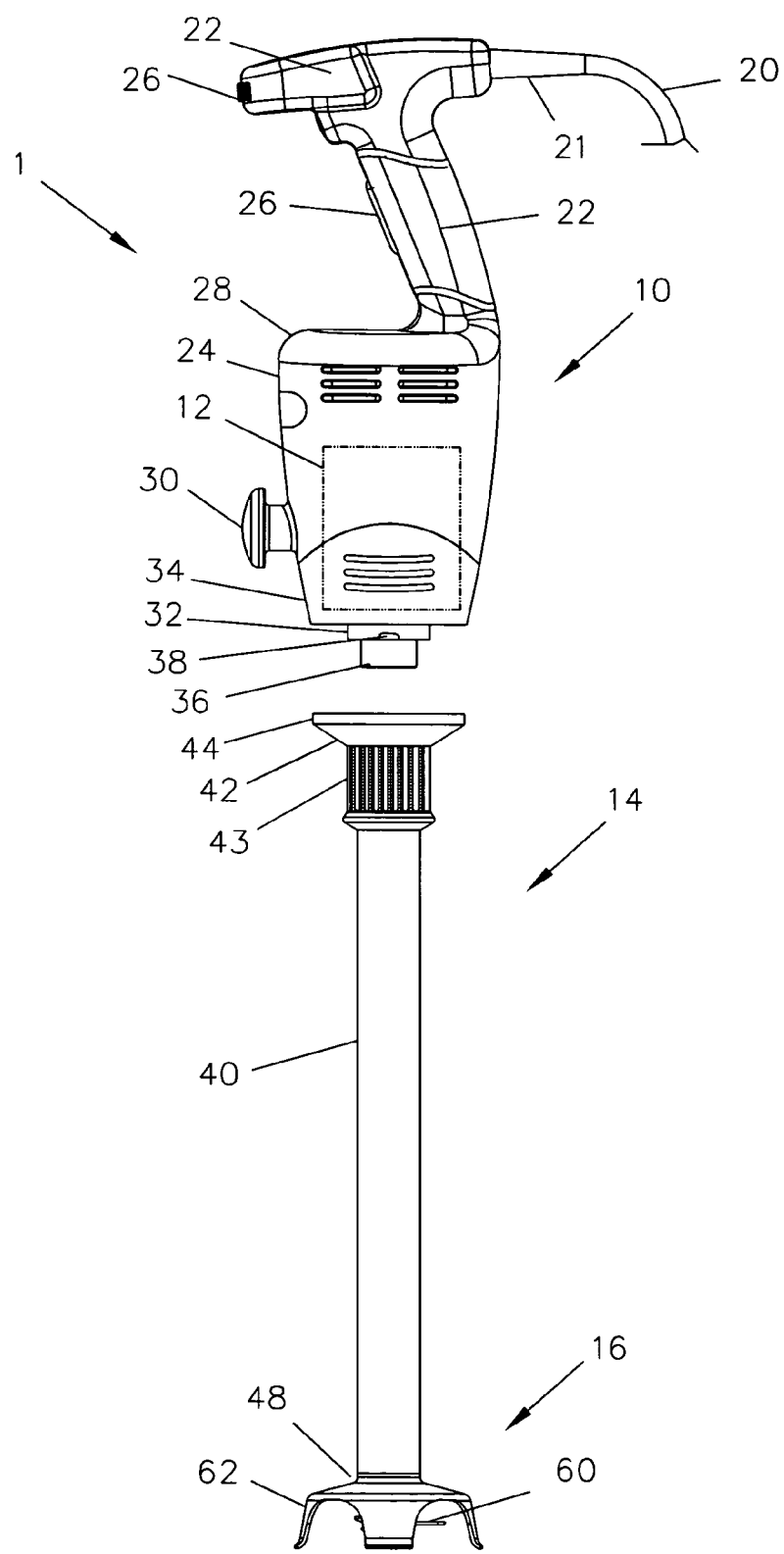
FIG. 1 is a first side view of a hand held blender in accordance with an illustrative embodiment of the present invention, showing a first portion and a second portion disconnected from each other or in a disengaged state.

Referring to the drawings and, in particular, FIG. 1, a hand held blender in accordance with an illustrative embodiment of the present invention is shown and generally represented by reference numeral 1. Hand held blender 1 essentially has a first body or portion 10 suitable for handling by an operator and for accommodating a drive motor 12, and a second body or portion 14 suitable for use in combination with any of a variety of separate containers to process (e.g., mix, chop, cut, etc.) any of a variety of different food stuffs of various consistencies from solid to viscous to liquid via a third portion 16 operatively connected to drive motor 12 by one or more transmission or rotating shafts 18, shown best in FIG. 2.

Figure 2:
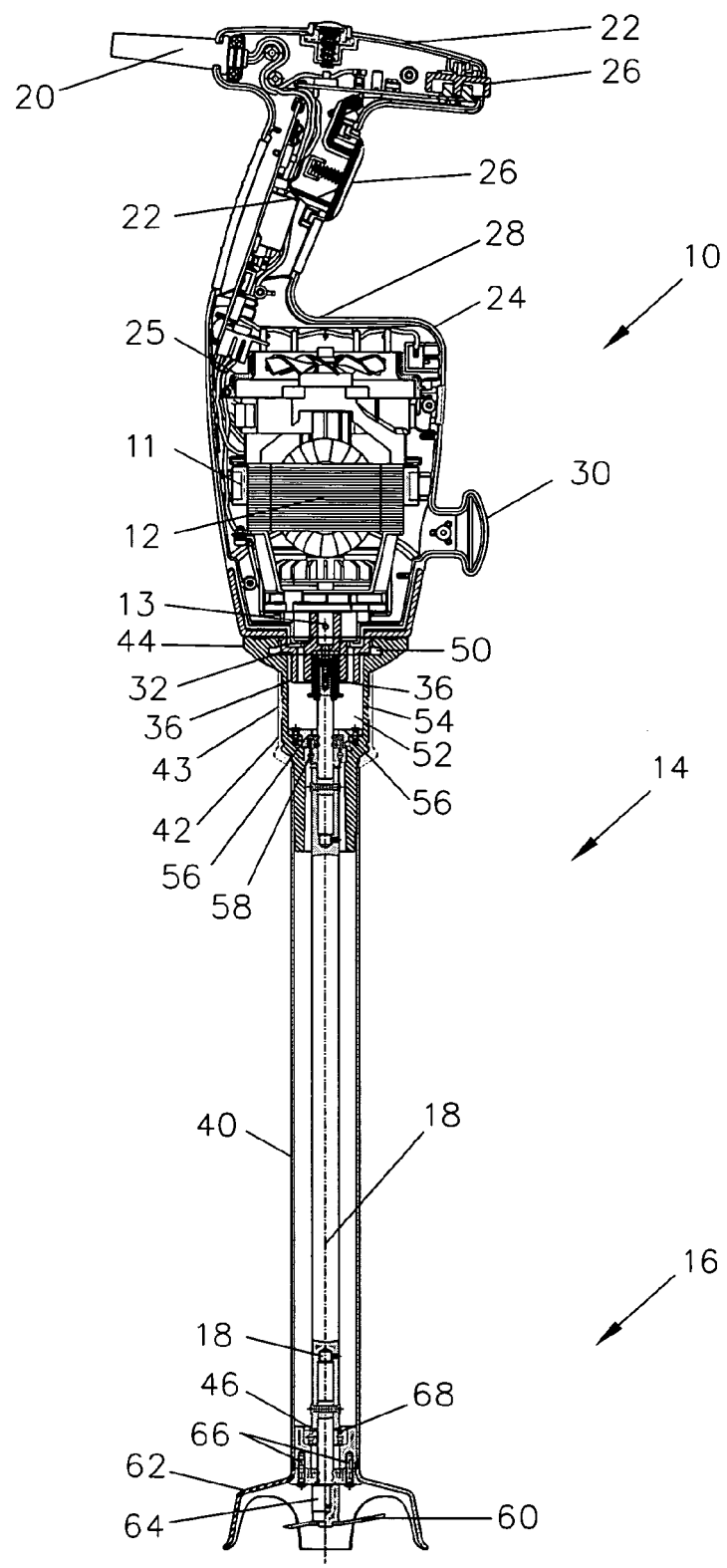
FIG. 2 is a side section view of the hand held blender of FIG. 1, showing the first and second portions connected to each other or in an engaged state.

Referring to FIGS. 1 and 2, first portion 10 can have a device for providing power to blender 1, such as, for example, a power cable 20, one or more handles 22, preferably ergonomically formed to provide easier handling during operation, a chamber or housing 24 for accommodating at least a portion of drive motor 12 and possibly a cooling system (e.g., a fan), one or more controls 26 (e.g., power on/off, speed, safety, etc.) preferably providing the operator with a wide array of operating options, and at least one first connector 32 facilitating second portion 14 being operatively connected to first portion 10. First portion 10 may also have any of a variety of other features and/or components as appropriate for accomplishing the stated purposes of the present invention. For example, first portion 10 may also have a stabilizing handle 30 giving the operator more control over the movement of blender 1 during operation.

Referring still to FIGS. 1 and 2, in a first preferred embodiment of the present invention, the one or more handles 22 are preferably at a distal end 28 of the first portion 10 while the at least one first connector 32 is preferably at a proximal end 34 thereof. First connector 32 can have any of a variety of configurations. For example as shown in these figures, first connector 32 can have a mounting hub 36 preferably having one or more prongs or tabs 38, best shown in FIGS. 1 and 4, and at least one aperture for accommodating a drive shaft 13, shown best in FIG. 2, and/or a motor coupling operatively connected to drive motor 12.

Figure 3:
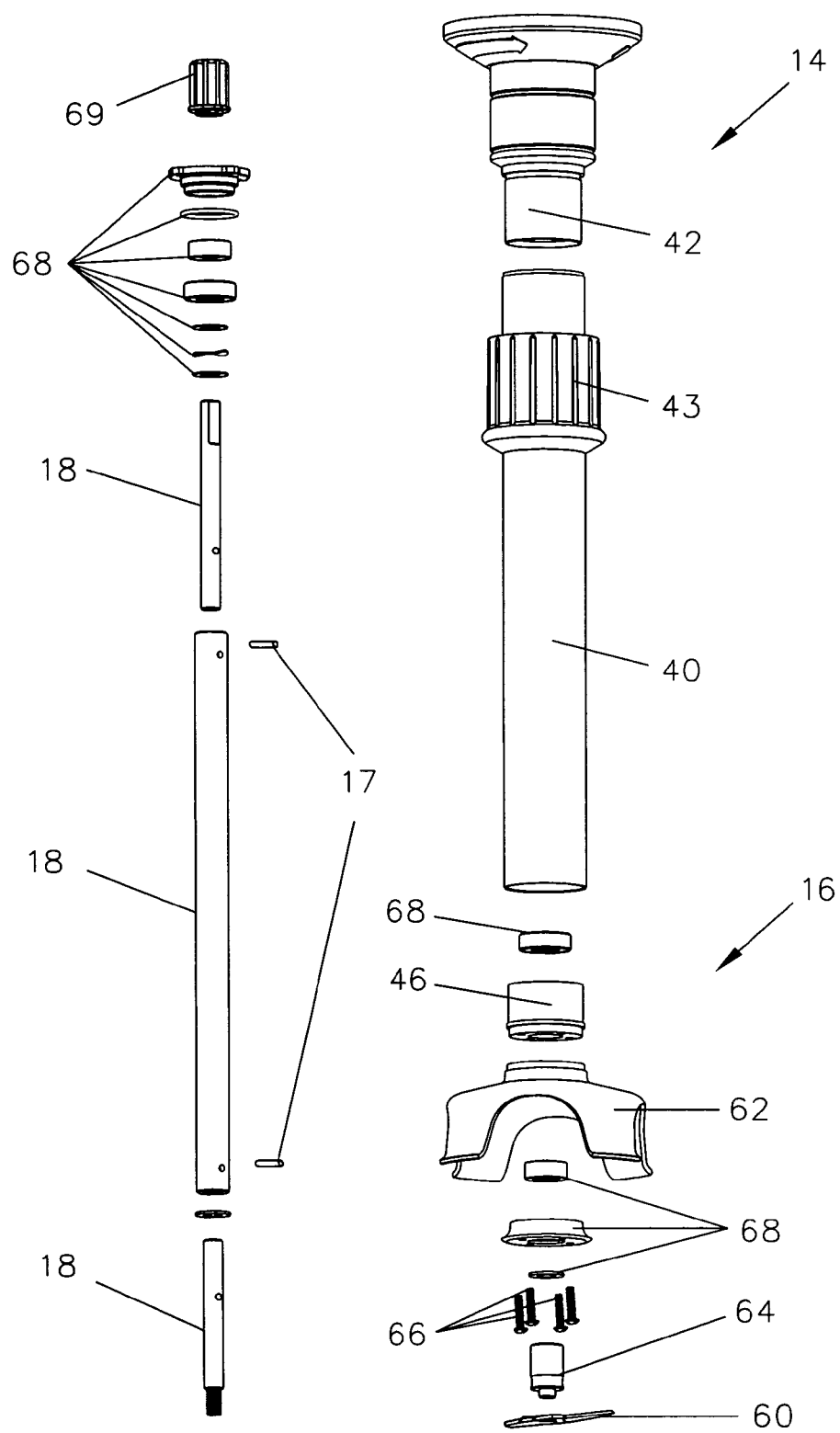
FIG. 3 is an exploded view of the second portion of the hand held blender of FIG. 1.

Drive shaft 13, in one aspect of the present invention, can provide or transmit rotational torque generated by drive motor 12 to the third portion 16 indirectly via the one or more rotating shafts 18. In this aspect of the present invention, drive shaft 13 and/or one or more rotating shafts 18 may be interconnected in any of a variety of conventional ways. For example, as shown in FIG. 3, a shaft connector 15, such as a link pin 17, may be used. Alternatively, in another aspect of the present invention, the drive shaft 13 provide rotational torque to the third portion 16 directly.

Figure 4:
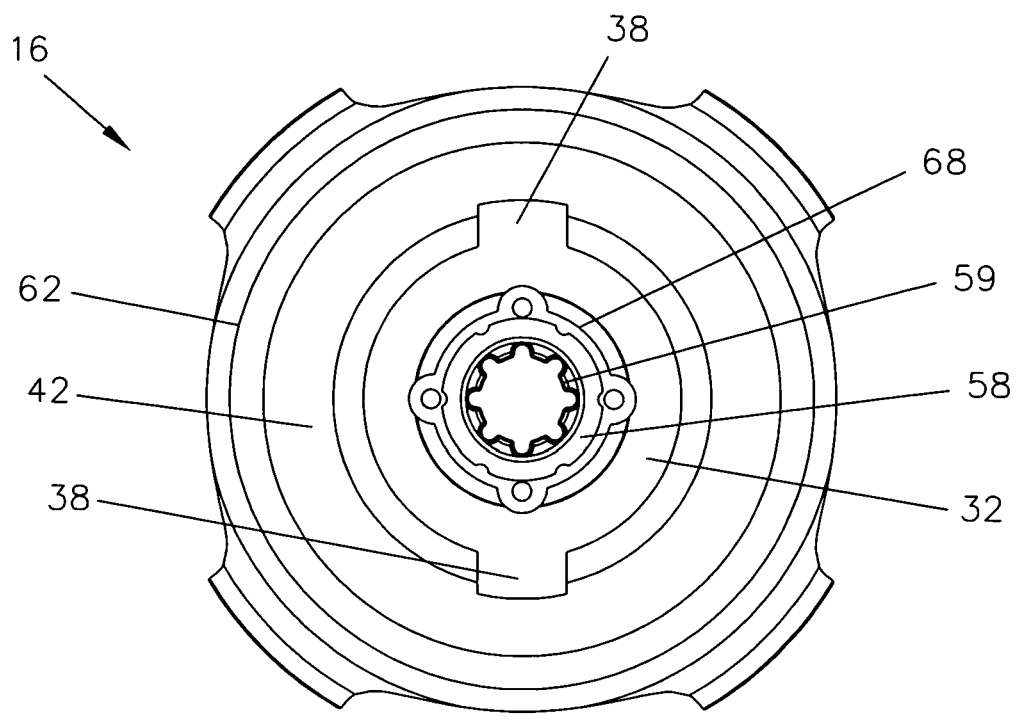
FIG. 4 is a top plan view of the second portion of the hand held blender of FIG. 1.
Figure 5:
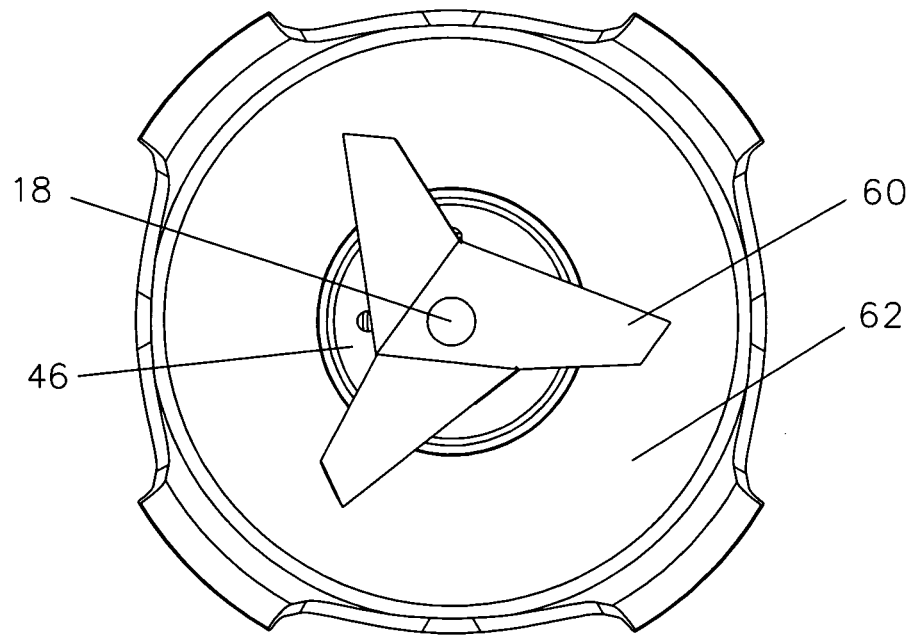
FIG. 5 is a bottom plan view of the second portion of the hand held blender of FIG. 1.

Referring now to FIGS. 3 through 5, second portion 14 can have an elongate member 40 that is preferably suitable to house or accommodate at least a portion of one or more rotating shafts 18 and/or drive shaft 13. In addition, second portion 14 may have at least one second connector 42 at a distal end 44 of elongate member 40 and at least one third connector 46 at a proximal end 48 thereof. Preferably, second connector 42 is complementary to first connector 32. For example, as best shown in FIG. 2, second connector 42 can have one or more grooves or slots 50 that are suitable to receive and/or engage the one or more tabs 38 of the first connector 32.

Thus, in a preferred embodiment of the present invention, first connector 32 and second connector 42 may be securely and reliably connected by engaging tabs 38 with slots 50 and twisting or rotating first connector 32 and second connector 42 with respect to each other to activate a lock/release mechanism. Preferably, a lock/release mechanism (not shown), such as, for example, a detent system or a biased cam system may be used to facilitate locking and/or releasing the connectors 28, 42 with respect to each other. Alternatively, in another embodiment of the present invention, first connector 32 and second connector 42 may be threadably engaged and/or disengaged as desired. Other rotating connections and/or locking mechanisms may additionally or alternatively be used and fall within the scope of the present invention.

Thus, although first and second portions 10, 14 can have any of a variety of different shapes, sizes and/or configurations, and may have any of a number of different elements, connectors 28, 42 preferably allow the operator to easily disengage or release second portion 14 and first portion 10 for separate cleaning and/or storage.

In a preferred aspect of the present invention, second connector 42 preferably hermetically seals distal end 44 to preferably prevent moisture and/or any other damaging substances from entering elongate member 40. This sealing feature may be accomplished in any of a variety of ways. For example, as best shown in FIG. 2, second connector 42 can have a chamber or pocket 52 suitable to receive and accommodate hub 36 of first connector 32. Pocket 52 preferably has sidwall 54 and a base 56. Base 56 is preferably formed of one or more first sealing elements 58, such as, for example, a bearing member, an oil seal, an o-ring, and/or a retaining member. Sealing elements may also be used. Preferably, first sealing elements 58 can be configured so that the one or more rotating shafts 18 and/or the drive shaft 13 may operatively pass therethrough without compromising the seal.

Referring to FIGS. 3 and 5, third portion 16, can accommodate at least a portion of a processing tool 60 via, for example, a tool guard 62 and/or a tool holder 64. In addition, third portion 16 can be operatively connected to second portion 14 via third connector 46 of second portion 14. For example, as best shown in FIG. 2, third connector 46 can have one or more fasteners 66 that are preferably suitable to securely and reliably connect third portion 16 to the proximal end 48 of elongate member 40. In another preferred aspect of the present invention, fasteners 66 facilitate the connection of second and third portions 14, 16.

In an alternative embodiment of the invention, fasteners 66 may be constructed so that third portion 16 and second portion 14 can be releasably connected. In this alternative embodiment of the invention, third connector 46 may cooperate with a fourth connector (not shown) in a manner similar to that described above with respect to the connection of first and second connectors 28, 42. In addition, other connections and/or locking mechanisms may additionally or alternatively be used, yet still fall within the scope of the present invention.

Although second and third portions 14, 16 can have any of a variety of different shapes, sizes and/or configurations, and may have any of a number of different elements, third and/or fourth connectors of this embodiment may allow the operator to conveniently disengage or release the second portion 14 and the third portion 16 from one another for separate cleaning, storage and/or operative uses.

In another preferred aspect of the present invention, third connector 46 preferably hermetically seals proximal end 48 of elongate member 40 to preferably prevent moisture and/or any other damaging substances from entering elongate member 40. Also, with respect to the embodiment of the invention in which second and third portions 14, 16 may be releasably connected, the third and/or fourth connector may preferably be suitable to seal and/or securely hold the various components of third portion 16 as appropriate for convenient cleaning, storage and/or operative use.

This sealing feature may be accomplished in any of a variety of ways. For example, as best shown in FIGS. 2 and 3, third connector 46 can cooperate with one or more second sealing elements 68, such as, for example, a bearing member, an oil seal, a cap element, and/or at least a portion of tool guard 62 or tool holder 64. Additional or alternative sealing elements may also be used. Preferably, second sealing elements 68 and/or third connector 46 can be constructed so that the one or more rotating shafts 18 may operatively pass therethrough, without compromising the seal, and transmit torque to processing tool 60.

Having identified and discussed some of the preferred aspects or embodiments of the present invention, in use, blender 1 may be efficiently and effectively assembled and/or disassembled as desired to allow for convenient cleaning, storage, and/or varied operative uses.

The present invention having been thus described with particular reference to the preferred forms thereof, it will be obvious that various changes and modifications may be made therein without departing from the spirit of the present invention as defined herein.

What is claimed is:

1. A handheld food blender comprising:
an electric motor;
a motor housing having a handle portion;
a manually actuable switch on said housing for selectively operating said electric motor;
a first connector on a distal end of said motor housing;
a first shaft coupling on a drive shaft extending from said motor housing adapted to be selectively rotationally driven by said electric motor;
a driven shaft housing having a single, unitary tube-shaped body having a hollow interior section and having a second connector being selectively attachable to and detachable from said first connector of said motor housing;
a driven shaft rotatably mounted in said driven shaft housing and having a second shaft coupling at a first end of said driven shaft that is selectively engageable with said first shaft coupling, and said driven shaft having a food blending tool attached to a second end of said driven shaft;

a first shaft bearing and sealing assembly mounted directly in said driven shaft housing at a first end of said driven shaft housing for rotatably mounting said driven shaft with respect to said driven shaft housing and for hermetically sealing said hollow interior section with respect to the surrounding environment; and a second shaft bearing and sealing assembly mounted directly in said driven shaft housing at a second end of said driven shaft housing for rotatably mounting said driven shaft with respect to said driven shaft housing and for hermetically sealing said hollow interior section with respect to the surrounding environment.

2. A blender according to claim 1, further comprising an elongated handle at said handle portion; and a stabilizing handle on said motor housing at a location remote from said elongated handle, said stabilizing handle being adapted to be grasped by a user's first hand while said elongated handle is grasped by a user's second hand.

* * * * *